C. F. TWITCHELL.
Machines for Nicking Metal Screws.

No. 151,522.  Patented June 2, 1874.

WITNESSES:
Henry B. Ellery
Linnie M. Allen

INVENTOR:
Charles F. Twitchell
PER. W. X. Stevens
ATTY.

AM. PHOTO-LITHOGRAPHIC Co. N.Y. (OSBORNE'S PROCESS.)

UNITED STATES PATENT OFFICE.

CHARLES F. TWICHELL, OF WORCESTER, MASSACHUSETTS.

IMPROVEMENT IN MACHINES FOR NICKING METAL SCREWS.

Specification forming part of Letters Patent No. 151,522, dated June 2, 1874; application filed December 15, 1873.

*To all whom it may concern:*

Be it known that I, CHARLES FREDRICK TWICHELL, of the city and county of Worcester and State of Massachusetts, have invented a Lathe for Finishing Screw-Heads, of which the following is a specification:

The object of my invention is to finish the heads of machine-screws, by squaring, or otherwise shaping, their tops and sides, and by cutting slots across their tops, by means of a chuck for holding the screws, a clamp for holding the squaring-up tool, and an arrangement of revolving cutters for squaring the sides and slotting the top of the screw-heads, so constructed that they may be all used as attachments to a common hand-lathe.

Figure 1:
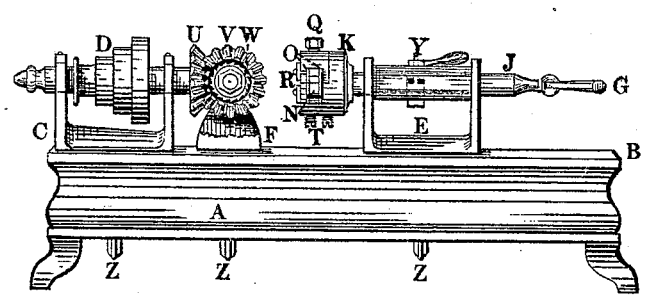
Figure 2:
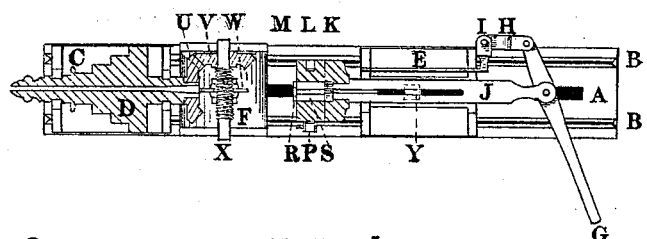
Figure 3:
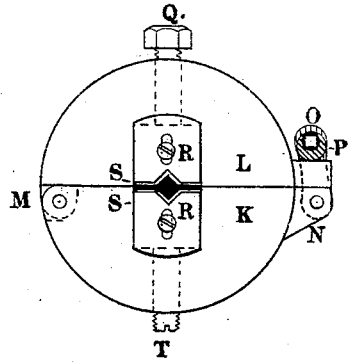
Figure 4:
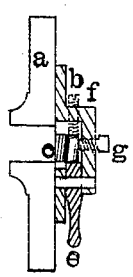
Figure 5:
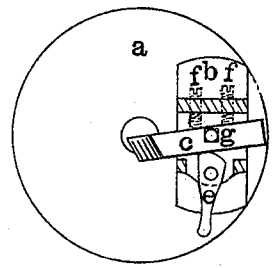

Figure 1 is a front elevation of a lathe with these devices attached. Fig. 2 is a horizontal longitudinal section partly in elevation. Fig. 3 is a front view of the chuck. Fig. 4 is a vertical section of the same. Fig. 5 is a front view of the tool-clamp.

A is the bed, provided with the V-shaped ways B. C is the head-stock, E the tail-stock, and D the cone of pulleys, of the lathe. Z Z Z are bolts depending from the head, tail, and cross stocks, between the shears of the bed A, through the lower ends of which pass the wedges or keys to hold said stocks upon the ways B. F is a frame similar to the head-stock, but placed across the lathe, and serves for bearings to the cutter or saw-arbor X. V is a beveled gear, secured upon one end of the arbor X, and run by a similar beveled gear, U, attached to the main spindle in place of the common face-plate. The saw or cutter W is secured upon the arbor X by means of the usual collars and binding-nuts, and may be set at any desired point upon the screw-thread which extends along the arbor. The saw shown upon the arbor is for slotting or nicking the screw-heads. For squaring the sides, two saws or cutters are used upon the arbor X, kept at the proper distance apart, to pass on each side of the screw-head, by means of a collar as thick as the head is to be, placed between them, and all bound to the arbor by the same pair of binding-nuts. The screw to be dressed, being held by its body in the jaws S of the chuck K, is pushed to the saw or cutters by means of the hand-lever G, actuating the mandrel J, on the forward end of which the chuck is held. The hand-lever G is hung, by means of the link H, to the bracket I, which is attached to the tail-stock E. The lever G, being pivoted to the mandrel J, may be made in the form of a loop, so as to allow the mandrel to pass through it between the pivots, when it is desired to pass long rods through the mandrel for finishing their ends. The main spindle in the cone D is bored completely through for the same purpose. A longitudinal slot in the tail-stock E, corresponding to a similar slot through the mandrel J, receives a stud, Y, which is provided with a screw, binding-nut, and handle, by which means said stud Y may be secured to the tail-stock at any point along the slot. This stud serves to prevent the mandrel J from revolving. It also serves as a stop, against which the rear end of the slot in mandrel J strikes, to regulate the forward limit of its movement. The chuck K is divided in a horizontal plane, about one-half of its length, so that its upper forward part may swing over on the hinge M, as shown in Fig. 3. P is an eccentric binder, hung in two links, O, which swing on pivots on the projection N, which is a portion of the stationary part of the chuck. Said eccentric, looping over and impinging upon a projection similar to N extending from the swinging part L, clamps the two parts of the chuck together; and the eccentric P, when turned by means of a wrench applied to the square end of its stem, binds the parts more firmly together. R R are plates secured to the faces of the jaws S S, nicked at the edge to fit the screw-head, and slotted to slide upon their binding-screws, so they may just fit the head when the jaws S fit the body of the screw, which is held between them. The jaws S fit in longitudinal cavities in the two parts K and L of the chuck, and are each provided with a rectangular groove, so as to receive between them the body of a screw to be finished.

In order to slot screw-heads, loosen the binding-cam P, and swing it off to disengage the upper part L of the chuck; raise part L and insert the body of the screw in the grooves of the clamps S; then return the parts L and O to place, and set the eccentric P so as to bind; then loosen the binding-screws of plates R R, and, by means of the upper screw Q and lower screw T, set the clamps S S upon the body of the screw to be slotted, and thus bind it in a central position; then bring the plates R R to fit the head, and secure them by the set-screws, when the clamps and plates will be in position to hold any number of screws of a certain size, one at a time; and they may be clamped, without further adjustment, by use of cam P only; then move the tail-stock E along the ways B, and bind it by means of bolt and wedge Z at any point desired, and set the stud Y so as to allow the mandrel J to advance the chuck and screw to the saw W, so as to cut the nick or slot of the desired depth. The saw having been set in a central line with the screw-head, by means of the binding-nuts on its arbor, is run by the gears V and U, and the usual belt on the cone D.

What I claim as my invention, and wish to secure by Letters Patent, is—

1. The beveled gears U V, arbor X, and cross-stock F, in combination with the body and head-stock of a lathe, substantially as described.

2. The combination, in a screw-holding chuck, of adjustable head-fitting plates or jaws R R with the body-fitting jaws S S, as described.

In testimony that I claim the foregoing, I have hereunto set my hand this 6th day of December, 1873.

CHARLES FREDRICK TWICHELL.

Witnesses:
   HENRY B. ELLERY,
   LINNIE M. ALLEN.